United States Patent [19]

Lakshmanan et al.

[11] Patent Number: 4,826,909
[45] Date of Patent: May 2, 1989

[54] COMPATIBLE POLYMER BLENDS USEFUL AS MELT ADHESIVES (III)

[75] Inventors: Pallavoor R. Lakshmanan, Houston; Paula J. Carrier, Seabrook, both of Tex.

[73] Assignee: Baychem International, Inc., Houston, Tex.

[21] Appl. No.: 193,778

[22] Filed: May 12, 1988

[51] Int. Cl.$^4$ .................. C08L 23/20; C08L 23/12
[52] U.S. Cl. .................. 524/478; 524/477; 524/487; 524/488; 524/528; 525/210; 525/240
[58] Field of Search .............. 525/240, 210; 524/488, 524/528, 487, 477, 478

[56] References Cited

U.S. PATENT DOCUMENTS

| | | | |
|---|---|---|---|
| 3,573,240 | 3/1971 | Flanagan | 525/240 |
| 4,554,304 | 11/1985 | Hansen et al. | 524/291 |
| 4,568,713 | 2/1986 | Hansen et al. | 524/291 |

*Primary Examiner*—Carman J. Seccuro
*Attorney, Agent, or Firm*—Joseph J. Carducci

[57] ABSTRACT

Compatible polymer blends useful as melt adhesives comprising a copolymer of butene-1 and from about 5.5 to about 20 weight percent of ethylene or propylene, a hydrocarbon tackifier and an amorphous polypropylene.

13 Claims, No Drawings

COMPATIBLE POLYMER BLENDS USEFUL AS MELT ADHESIVES (III)

BACKGROUND OF THE INVENTION

1. Field of the Invention

This invention relates to compatible polymer blends useful as melt adhesives comprising (1) a copolymer of butene-1 and from about 5.5 to about 20 weight percent of ethylene or propylene; (2) a hydrocarbon tackifier; and (3) an amorphous polypropylene (amorphous polyalphaolefins).

2. Description of the Prior Art

Hot melt adhesives have found extensive use in industry in bonding, joining or fabrication of various structures, including construction of structues from synthetic polymeric films, such as polyethylene, polypropylene, etc.; foil, including metal foil such as aluminum foil, wax-coated or wax-impregnated cellulosic structures; and various non-woven materials whose constituents are based on polyolefins, polyesters, polyamides and acrylic-type polymers.

The modern trend in the packaging industry, for example, is to use more of the plastic-based or plastic-finished constructions, such as polyethylene or polypropylene extrusion coated or laminated boards. Such structures are replacing conventional clay-coated boards in many packaging applications. The advantages of using composite construction of plastic-to-plastic or plastic-to-paper, and other such combinations, are several, for example, with respect to aesthetics, print graphics, barrier properties toward moisture (humidity), oxygen and odor, etc. A better barrier, for example, will prevent, or tend to inhibit, spoilage of the packaged contents. Plastic-utilized composite constructions are now routinely used for beverage cartons or sleeves, to hold dry goods and consumable items, frozen juice, household detergents and cleaners, poultry and fresh product packages, etc.

The change in various packaging laminate from paper or paperboard to plastic and non-woven products based on synthetic polymers also necessitates that the various adhesives chosen to hold the structures together be compatible with the materials of construction, since the altered surface chemistry of such materials may not be adhesion compatible with traditionally-available hot melt adhesives.

Thus, it is important that the hot melt adhesives used to prepare the various composites be compatible with the materials of construction and that they exhibit good specific adhesion thereto, particularly wherein such materials are made using synthetic polymers, such as polyethylene, polypropylene, etc.

In addition, since hot melt adhesives are a multicomponent system which experiences prolonged elevated temperature exposures, for example at 350° F. (176.6° C.) or even higher, in production or in use, it is especially important that they show melt stability over a period of time until their use and not lose their homogeneity, become unstable and exhibit stratification, resulting in substantial loss in their adhesive performance. Moreover, some hot melt adhesives, even at such elevated temperatures, are still so viscous, for example, they can have a viscosity at such temperatures well above 15,000 cps, that they can be applied to the substrate with only very great difficulty.

We have found that the novel polymeric blends defines and claimed herein, that is, containing a copolymer of butene-1 and from about 5.5 to about 20 weight percent of ethylene or propylene; a hydrocarbon tackifier; and an amorphous polypropylene (amorphous polyalphaolefins) are eminently useful as hot melt adhesives with the substrates defined above, in that they are compatible therewith, exhibit remarkable adhesion thereto and remain stable at elevated temperatures of application.

SUMMARY OF THE INVENTION

The novel compatible polymer blends useful as hot melt adhesives defined and claimed herein comprise (1) a copolymer of butene-1 and from about 5.5 to about 20 weight percent of ethylene or propylene; (2) a hydrocarbon tackifier; and (3) an amorphous polypropylene (amorphous polyalphaolefins).

The copolymer of butene-1 and ethylene or propylene used herein are high molecular weight polymers, generally rigid at atmospheric temperatures but easily flowable when heated. Their melt index, determined in accordance with ASTM D 1236 is desirably in the range of about 0.3 to about 2000 grams/10 minutes, or even higher, preferably in the range of about 3.0 to about 2000 grams/10 minutes. Since ethylene, and even propylene, can be present during the polymerization process when butene-1 is polymerized to prepare the butene-1 copolymer that can be used herein, the resulting polymers will contain from about 5.5 to about 20, generally from about 5.5 to about 10, weight percent of ethylene or propylene. Definitions of suitable butene-1 copolymers useful in the preparation of the novel hot melt adhesives claimed herein can be found, for example, in U.S. Pat. No. 4,568,713 to Hansen.

The hydrocarbon tackifiers suitable for use in preparing the novel hot melt adhesives claimed herein can be selected from any hydrocarbon tackifier generally used, or suitable for use, in the preparation of hot melt adhesives. A particularly suitable tackifier can be obtained from commercially available hydrocarbon resins resulting from the polymerization of monomers consisting of olefins, cycloolefins and diolefins, for example, residual byproduct monomers resulting from the manufacture of isoprene. Such tackifiers are described, for example, in U.S. Pats. Nos. 3,932,330 to Lakshmanan, 4,022,728 to Trotter et al and 4,072,735 to Ardemagni. Such petroleum-derived hydrocarbon resins are sometimes also referred to as synthetic terpene resins. Other types of tackifiers also suitable for use herein include products obtained from cyclopentadiene and dicyclopentadiene polymerization and subsequent hydrogenation, conventional terpene resins and modified terpene resins obtained as a result of the polymerization of such terpene-derived monomers, such as alpha- and beta-pinene and limonene. Petroleum hydrocarbon resins that have been post hydrogenated to yield a more thermally stable resin are especially preferred. The tackifier used to prepare the novel melt adhesive compositions claimed herein will typically exhibit a ring and ball softening point (ASTM E 28) in the range of about 10° to about 150° C., preferably about 25° to about 120° C.

The third necessary component required to prepare the novel hot melt adhesive claimed herein are amorphous (atactic) polypropylenes, including amorphous polyalphaolefins, and combinations thereof, which exhibit varying extent of solubility in hydrocarbon solvents, such as pentane, hexane, etc., have a crystallinity of less than about 10 weight per cent, preferably less than about five weight percent and possess a molecular weight in the range of about 300 to about 50,000, preferably about 1000 to about 25,000. The method used in preparing the amorphous polypropylene or amorphous polyalphaolefins and recovering the same, has no effect on its utilization in the preparation of the novel melt adhesive claimed herein. Thus, amorphous polypropylene formed as a byproduct in minor amounts during the production of crystalline polypropylene (homo or copolymer resins) by the polymerization of propylene in the presence of stereospecific catalysts by processes disclosed, for example, in U.S. Pat. Nos. 3,679,775 to Hagemeyer et al, 3,529,037 also to Hagemeyer et al and 3,900,694 to Jurrens can be used. On the other hand amorphous polypropylene (amorphous polyalphaolefins) produced directly, that is, by intent, without the production of crystalline copolymers of propylene and lower olefins, as disclosed, for example, in U.S. Pat. Nos. 3,923,758 to Carter et al, 3,954,697 to McConnell et al, 4,072,812 to McConnell et al, 4,072,813 to McConnell et al, 4,259,470 to Trotter et al, 4,309,522 to Dietrich et al and 4,317,897 to Herrmann et al can also be used. While the amorphous polypropylenes (amorphous polyalphaolefins) used herein can be homopolymers of propylene, it is within the purview of our invention to use substantially amorphous products based on propylene copolymerized with olefins, such as ethylene, butene, pentene, hexene, nonene, decene, etc., whether such products have been obtained intentionally or as by-products. The latter copolymers are defined herein as "amorphous polyalphaolefins". In the claimed invention herein, the term "amorphous polypropylene" is intended to include the said "amorphous polyalphaolefins". Such amorphous copolymers can have a melt viscosity in the range of about 200 to about 50,000, or even higher, cps at 375° F. (190.5° C.) (ASTM D 3236). These copolymers will contain propylene in an amount ranging from about 25 to about 99.5, or even higher, weight percent, generally from about 50 to about 99.5, or even higher, weight percent, with the remainder being one or more of the other olefins identified above. The amorphous polyalphaolefins useful herein are further described, for example, in U.S. Pat. Nos. 4,022,728 to Trotter et al, 4,120,916 to Meyer et al, 4,210,570 to Trotter et al, 4,264,756 to Trotter et al and 4,288,358 to Trotter et al.

The three components required to obtain the novel hot melt adhesives claimed herein can be present in the amounts defined below in Table I.

TABLE I

| | Weight Percent | |
|---|---|---|
| | Broad Range | Preferred Range |
| (1) Butene-1 Copolymer | 10–40 | 20–40 |
| (2) Hydrocarbon Tackifier | 20–50 | 20–40 |
| (3) Amorphous Polypropylene | 20–70 | 20–60 |

In an embodiment herein, our novel hot melt adhesive can have incorporated therein a paraffin or a microcrystalline wax in order to reduce the viscosity thereof to facilitate the application of the adhesive to a substrate. Paraffin waxes used are those composed mainly of straight chain or branched chain molecules. Fully refined paraffin waxes suitable for use herein have melting points ranging from about 115° (46.1° C.) to about 155° F. (68.3° C.). Microcrystalline waxes that are useful are those that are complex mixtures of monocyclic and polycyclic hydrocarbons, along with lesser amounts of branch chains and isoparaffins containing only minor amounts of normal paraffins. The crystals of microcrystalline waxes are much smaller than those of paraffin waxes. The melting points of the microcrystalline waxes will range from about 140° (60.0° C.) to about 190° F. (87.8° C.). When a wax is used it can be present in an amount upto about 40 weight percent, based on the final adhesive composition, but generally the amount used will be less than about 25 weight percent.

Since hot melt adhesives tend to experience varying degrees of thermal exposure during thermal processing and/or during application to the substrate, it is desirable to incorporate therein one or more antioxidants in small amounts to inhibit thermal and/or thermoxidative degradation. Several types of commercial products, predominantly of the hindered phenol types, are available for this purpose to function as primary antioxidants. A secondary antioxidant belonging to the general classification of thioesters and phosphites can also be used in combination with the hindered phenols. Exemplary of antioxidants suitable for use herein include tetrakis [methylene 3-(3′,5′-di-t-butyl-4-hydroxyphenyl)propionate] methane; 2,2′-ethyldenebis (4,6-di-tertiary-butylphenol); 1,1-3-tris (2-methyl-4-hydroxy-5-t-butyl phenyl) butane; and 1,3,5-trimethyl-2,4,6-tris (3,5-tert-butyl-4-hydroxybenzyl) benzene. Secondary antioxidants, such as dilaurylthiodipropionate; pentaerythritol tetrakis (beta-laurylthiopropionate) and various alkyl-, aryl-, di- and polyphosphites and thiophosphites can also be employed in combination with appropriate hindered phenols. Effective amounts of antioxidants that can be used can range from about 0.05 to about five weight percent, preferably from about 0.1 to about 2.5 weight percent, based on the weight of the final adhesive composition.

The preparation of the novel hot melt adhesive claimed herein is not critical and any suitable method can be employed. In a preferred embodiment in a mixing vessel are placed sufficient amounts of amorphous polypropylene, tackifier and the requisite amount of antioxidant at room temperature. The contents are then heated gradually to a point of softening of the mixture. At this point stirring is commenced and the temperature is raised to a range of about 325° F. (162.8° C.) to about 400° F. (204.4° C.). At this point the requisite amount of butene-1 copolymer is added in small quantities with continued mixing until the completion of the addition of the butene-1 copolymer. Mixing is continued to a mass homogeneity. If wax is also used it is added at the outset. The total mixing time is generally in the range of about 0.5 to about two hours.

BRIEF DESCRIPTION OF PREFERRED EMBODIMENTS

The present invention can further be illustrated by the following. A number of compositions were prepared using a 500 milliliter stainless steel beaker which was heated by a Glas-col mantle capable of providing temperatures ranging from 350° F. (176.6° C.) to 380° F. (193.3° C.). A Talboys T-line Lab Stirrer was used to mix the various compositions. Tackifier, amorphous polypropylene and antioxidant were placed in the stainless steel beaker. Heating was begun, starting at room temperature, until the desired compounding temperature was reached. Stirring was commenced to homogenize the mass, at which point the requisite amount of butene-1 copolymer was added in small quantities with continued mixing. At the completion of the addition of the butene-1 copolymer, stirring was continued to homogeneity. When wax was added, this was done at the outset. The mixing time ranged from about one to ½ hours. The mixing composition was then collected on a release line tray.

The thermal stabilities of the adhesive compositions that were prepared were determined by exposing about eight to ten gram quantities of a sample in a five-inch x one-inch test tube to a temperature environment of 350° F. (176.6° C.) for 24 hours. At the end of 24 hours, the composition was visually observed for any separation stratification and loss in composition homogeneity. The ring and ball softening points of the compositions were determined according to ASTM Procedure E 28. The melt viscosities of the compositions were determined according to ASTM Procedure D 3236, while the needle penetrations were determined according to ASTM D 1321.

To determine peel strength values of the compositions, polyethylene laminated test specimens were prepared by applying the compositions to a 4.0 mil (one inch by four inch) high density polyethylene film by means of a Slautterback "minisquirt" hot melt gun. The composition was applied at 350° F. (176.6° C.) to the film as a continuous strip ½-inch wide across the film width and then a film of the same dimensions was placed on top of the film carrying the strip of the composition. A silicone release sheet was then placed on the top of the assembly and sufficient contact pressure was applied via a rubber roller to spread the adhesive and to bring it into intimate contact with the surfaces. The laminates were then aged for a minimum of 24 hours prior to testing. Three specimens for each composition were prepared and the bond strength was measured by peeling at the glue line by means of a J. J. Lloyd Tensile Tester at a peel rate of 50 millimeters per minutes. The maximum force in grams necessary to cause rupture of the bond was noted. The average of three such determinations was recorded.

Polypropylene test specimens were prepared by applying the compositions so prepared to a 3.0 mil (one inch by six inch) polypropylene film by means of a Slautterback "minisquirt" hot melt gun. The composition was applied to the film as a continuous ½-inch strip across the width (one inch) of the substrate. Then a film of the same dimension was placed on top of a film carrying the strip of the composition. A silicone release sheet was then placed on the top of the assembly and sufficient contact pressure was applied via a rubber roller to spread the adhesive and to bring it into intimate contact with the surfaces. The laminates were then aged for 24 hours prior to testing. Three such assemblies were prepared for each adhesive evaluation. Testing procedures were the same for the polyethylene specimens.

The components used in the preparation of the polymer blends are identified below in Table II. In the tables below, the butene-1 copolymers are referred to as polybutylene.

TABLE II

| List Of Raw Materials | | | |
|---|---|---|---|
| | Supplier | Trade Name | Characteristics |
| Polymer | | | |
| Polybutylene | Shell Chemical | Duraflex 8910 | Density, 0.895; M.I. 500 Ethylene Content, 5.5% by wt. |
| Polybutylene | Shell Chemical | Duraflex 8X10 | Density, 0.895; M.I. 100 Ethylene Content, 5.5% by wt. |
| Polybutylene | Shell Chemical | Duraflex 0400 | Density, 0.915; M.I. 20 Homopolymer |
| Tackifier | | | |
| Petroleum Hydrocarbon Resin | Goodyear Chemicals | Wingtac 95 | Ring & Ball Soft. Pt. 95 C. |
| Hydrogenated Rosin Ester | Hercules Inc. | Foral 85 | Ring & Ball Soft. Pt. 85 C. |
| Wax | | | |
| Microcrystalline Wax | Shell Chemical | Shellmax 400 | Melt Point 177 F. (80.55 C.) |
| Paraffin Wax | Shell Chemical | Shellwax 300 | Melt Point 159 F. (70.55 C.) |
| Amorphous Polypropylene & Amorphous Polyalphaolefins | | | |
| Amorphous Polypropylene | Baychem | K-Tac 100A | Viscosity @ 375 F. (190.5 C.), 950 cps |
| Amorphous Polypropylene | Eastman | Eastobond M-5C | Viscosity @ 375 F. (190.5 C.), 3650 cp |
| Amorphous Polypropylene | Eastman | Eastobond M-5H | Viscosity @ 375 F. (190.5 C.), 2000 cp |
| Amorphous Polyalphaolefin | Huls | Vestoplast 703 | Viscosity @ 375 F. (190.5 C.), 2500 cp |
| Antioxidant | | | |
| Hindered Phenol | Schenectady Chemicals | Isonox 129 | Melt. Point. 162 C. |
| Dilauryl thiodipropionate (DLTDP) | Evans Chemetics | DLTDP | Melt. Point. 40 C. |

Data obtained in a series of base runs are set forth below in Table III.

TABLE III

| Run No. | 1 | 2 | 3 | 4 |
|---|---|---|---|---|
| | Parts by Weight, Grams | | | |
| Polybutylene, Duraflex 8910 | 46.00 | 30.00 | 30.00 | — |
| Polybutylene, Duraflex 0400 | — | — | — | 30.00 |
| Wingtack 95 (Tackifier) | 54.00 | 35.00 | 35.00 | — |
| Foral 85 (Tackifier) | — | — | — | 35.00 |
| APP, K-TAC 100A | — | — | — | 25.00 |
| Shellmax 400 (Wax) | — | 35.00 | — | — |
| Shellwax 300 (Wax) | — | — | 35.00 | 10.00 |
| Isonox 129/DLTDP (1:3 wt. ratio) | 0.40 | 0.40 | 0.40 | 0.40 |
| Total | 100.40 | 100.40 | 100.40 | 100.40 |
| Properties | | | | |
| Stability | OK | OK | OK | OK |
| Ring & Ball Soft. Pt. | | | | |
| (R & B) °F. | 245 | 188 | 185 | 243 |
| (°C.) | (118.3) | (86.7) | (85.0) | (117.2) |
| Viscosity, cps, 350° F. (176.6° C.) | 51,000 | 425 | 300 | 13,000 |
| N.P., decimillimeter (dmm), 77° F. (25° C.) | 1.8 | 11.3 | 9.7 | 15.8 |
| Performance | | | | |
| Peel Strength, g/in., | | | | |

TABLE III-continued

| Run No. | 1 | 2 | 3 | 4 |
|---|---|---|---|---|
| | Parts by Weight, Grams | | | |
| 50 mm/min. | | | | |
| HDPE/HDPE (4 mil) | Fail | 900 | 180 | 3402 |
| PP/PP (3 mil) | Fail | 135 | 180 | Fail |

It can be seen from Run No. 1 in Table III that when the hot melt adhesive contains only a copolymer of butene-1 and ethylene (Duraflex 8910, which contains 5½ weight percent ethylene) and a tackifier, it exhibits no adhesion to high density polyethylene (HDPE) or to polypropylene (PP). When the hot melt adhesive contains the same copolymer of butene-1 and ethylene and the same tackifier as in Run No. 1 and additionally a wax (Runs Nos. 2 and 3), the adhesion to HDPE and to PP surfaces is only marginal. The minimum desired peel strength for adhesion to HDPE is at least 1000 grams/inch and to PP is at least 500. When an adhesive was prepared in Run No. 4 using Duraflex 0400 (essentially a homopolymer of butene-1, i.e., isotactic polybutylene), a tackifier, an atactic polypropylene (K-TAC 100A) and wax, adhesion to HDPE was excellent but failed with PP. The significance of Run No. 4 is that even though an amorphous polypropylene was present in the adhesive, the fact that an essentially homopolymer of butene-1 was used instead of the desired copolymer, defined above, that is one containing from about 5.5 weight to about 20 percent of ethylene or propylene, an adhesive was obtained that was unsatisfactory in adhesion to each of the polymer substrates.

An additional series of runs was carried out showing that when the melt adhesive carries the components required herein, excellent adhesion to the substrates HDPE and PP is obtained. This is shown below in Table IV.

TABLE IV

| Run No. | 5 | 6 | 7 | 8 | 9 | 10 |
|---|---|---|---|---|---|---|
| | Parts by Weight, Grams | | | | | |
| Polybutylene, Duraflex 8910 | 30.00 | 30.00 | — | 30.00 | 30.00 | 30.00 |
| Polybutylene, Duraflex 8 × 10 | — | — | 30.00 | — | — | — |
| Wingtack 95 (Tackifier) | 35.00 | 35.00 | 35.00 | 35.00 | 35.00 | 35.00 |
| APP, K-TAC 100A | 35.00 | — | 35.00 | 17.50 | 17.50 | — |
| APP, Eastman M-5C | — | 35.00 | — | — | — | 17.50 |
| Shellmax 400 (Wax) | — | — | — | 17.50 | — | 17.50 |
| Shellwax 300 (Wax) | — | — | — | — | 17.50 | — |
| Isonox 129/DLTDP (1:3 Wt. Ratio) | 0.40 | 0.40 | 0.40 | 0.40 | 0.40 | 0.40 |
| Total | 100.40 | 100.40 | 100.40 | 100.40 | 100.40 | 100.40 |
| Properties | | | | | | |
| Stability | OK | OK | OK | OK | OK | OK |
| Ring & Ball Soft. Pt. | | | | | | |
| (R & B) °F. | 257 | 195 | 224 | 198 | 200 | 185 |
| (°C.) | (125) | (90.5) | (106.6) | (92.2) | (93.3) | (85) |
| Viscosity, cps, 350° F. (176.6° C.) | 2800 | 2350 | 4700 | 1225 | 1150 | 1550 |
| N.P., decimillimeter (dmm) 77° F. (25° C.) | 19.8 | 19.6 | 14.1 | 25.7 | 22.8 | 24 |
| Performance | | | | | | |
| Peel Strength, g/in., 50 m/min. | | | | | | |
| HDPE/HDPE (4 mil) | 5513 | 5670 | 4900 | 3690 | 1575 | 4545 |
| PP/PP (3 mil) | 2745 | 2880 | 2722 | 2475 | 2610 | 2250 |

Runs Nos. 5, 6 and 7 show that when an adhesive is prepared using a copolymer of butene-1 and 5.5 weight percent ethylene (Duraflex 8910 or Duraflex 8×10), an amorphous polypropylene and a tackifier, in accordance with the invention defined herein, extremely high adhesion bo both an HDPE and PP substrate is obtained. Reducing the amount of atactic polypropylene and the addition of a wax to the adhesive still resulted in an adhesive having superior adhesivity to HDPE and PP in Runs Nos. 8, 9 and 10.

The runs whose data are set forth below in Table V further show that an adhesive containing the defined butene-1 copolymer, a tackifier and an amorphous polypropylene, with or without the additional presence of wax, results in an adhesive exhibiting excellent adhesion to HDPE and PP surfaces.

TABLE V

| Run No. | 11 | 12 | 13 | 14 |
|---|---|---|---|---|
| | Parts by Weight, Grams | | | |
| Polybutylene, Duraflex 8910 | 30.00 | 30.00 | 30.00 | 30.00 |
| Wingtack 95 (Tackifier) | 35.00 | 35.00 | 35.00 | 35.00 |
| Amorphous Polypropylene, Eastobond M-5H | 35.00 | — | 17.50 | — |
| Amorphous Polyalphaolefin, Vestoplast 703 | — | 35.00 | — | 17.50 |
| Shellmax 400 (Wax) | — | — | 17.50 | 17.50 |
| Isonox 129/DLTDP (1:3 wt. ratio) | 0.40 | 0.40 | 0.40 | 0.40 |
| Total | 100.40 | 100.40 | 100.40 | 100.40 |
| Properties | | | | |
| Stability | OK | OK | OK | OK |
| Ring & Ball Soft. Pt. | | | | |
| (R & B) °F. | 286 | 236 | 260 | 220 |
| (°C.) | (141) | (113.3) | (126.6) | (104.4) |
| Viscosity, cps, 350° F. (176.6° C.) | 3725 | 3875 | 1400 | 1500 |
| N.P., decimillimeter (dmm), 77° F. (25° C.) | 18.1 | 14.1 | 22.1 | 17.1 |
| Performance | | | | |
| Peel Strength, g/in., 50 mm/min. | | | | |
| HDPE/HDPE (4 mil) | 5625 | 5850 | 4095 | 4725 |
| PP/PP (3 mil) | 2745 | 2880 | 3015 | 2875 |

Obviously, many modifications and variations of the invention, as hereinabove set forth, can be made without departing from the spirit and scope thereof and therefore only such limitations should be imposed as are indicated in the appended claims.

We claim:
1. A compatible polymer blend useful as a melt adhesive for adherence to polyethylene and polypropylene substrates comprising (1) the copolymer of butene-1 and from about 5.5 to about 20 weight percent of an olefin selected from the group consisting of ethylene and propylene, (2) a hydrocarbon tackifier and (3) an amorphous polypropylene, wherein said copolymer has a melt index in the range of about 0.3 to about 2000 grams/10 minutes, said hydrocarbon tackifier has a ring and ball softening point in the range of about 10° to about 150° C., said amorphous polypropylene has a crystallinity of less than about 10 weight percent and a molecular weight in the range of about 300 to about 50,000 and wherein said components are present in the following amounts:

|  | Weight Percent |
|---|---|
| Butene-1 Copolymer | 10–40 |
| Hydrocarbon Tackifier | 20–50 |
| Amorphous Polypropylene | 20–70. |

2. The polymer blend of claim 1 wherein said copolymer is a copolymer of butene-1 and ethylene.

3. The polymer blend of claim 2 wherein said copolymer contains from about 5.5 to about 10 weight percent of ethylene.

4. The polymer blend of claim 2 wherein said copolymer has a melt index in the range of about 3.0 to about 2000 grams/10 minutes.

5. The polymer blend of claim 2 wherein said hydrocarbon tackifier has a ring and ball softening point in the range of about 25° to about 120° C.

6. The polymer blend of claim 2 wherein said amorphous polypropylene is obtained as a byproduct during the production of crystalline polypropylene.

7. The polymer blend of claim 2 wherein said amorphous polypropylene is obtained as a direct product of the polymerization of propylene without the formation of crystalline polypropylene.

8. The polymer blend of claim 2 wherein said amorphous polypropylene has a crystallinity of less than about five weight percent and a molecular weight in the range of about 1000 to about 25,000.

9. The polymer blend of claim 2 wherein said copolymer has a melt index in the range of about 3.0 to about 2000 grams/10 minutes, said hydrocarbon tackifier has a ring and ball softening point in the range of about 25° to about 120° C. and said amorphous polypropylene has a crystallinity of less than about five weight percent and a molecular weight in the range of about 1000 to about 25,000.

10. The polymer blend of claim 2 wherein said components are present in the following amounts:

|  | Weight Percent |
|---|---|
| Butene-1 Copolymer | 20–40 |
| Hydrocarbon Tackifier | 20–40 |
| Amorphous Polypropylene | 20–60. |

11. The polymer blend of claim 2 wherein a paraffin wax or a microcrystalline wax is also present.

12. The polymer blend of claim 2 wherein an antioxidant is also present.

13. The polymer blend of claim 2 wherein a paraffin wax or a microcrystalline wax and an antioxidant are also present.

* * * * *